(12) United States Patent
Tan et al.

(10) Patent No.: US 9,892,013 B2
(45) Date of Patent: Feb. 13, 2018

(54) METHOD AND DEVICE FOR DISPLAYING INCREMENTAL UPDATE PROGRESS

(71) Applicant: Tencent Technology (Shenzhen) Company Limited, Shenzhen, Guangdong (CN)

(72) Inventors: Siying Tan, Shenzhen (CN); Liang Yu, Shenzhen (CN); Deliang Zhu, Shenzhen (CN); Xuezhu Wu, Shenzhen (CN); Shaobo Fan, Shenzhen (CN); Lifei Xiang, Shenzhen (CN); Shengwei Lin, Shenzhen (CN); Yusheng Zhong, Shenzhen (CN); Xing Shao, Shenzhen (CN); Tao Zhu, Shenzhen (CN); Jia Zeng, Shenzhen (CN); Jing Lv, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/722,901

(22) Filed: May 27, 2015

(65) Prior Publication Data

US 2015/0261645 A1    Sep. 17, 2015

Related U.S. Application Data

(63) Continuation of application No. PCT/CN2013/078901, filed on Jul. 5, 2013.

(30) Foreign Application Priority Data

Dec. 4, 2012    (CN) .......................... 2012 1 0512235

(51) Int. Cl.
*G06F 9/44*    (2006.01)
*G06F 9/445*    (2006.01)
*G06F 11/32*    (2006.01)

(52) U.S. Cl.
CPC .............. *G06F 11/323* (2013.01); *G06F 8/68* (2013.01)

(58) Field of Classification Search
CPC . G06F 11/323; G06F 8/60; G06F 8/65; G06F 8/68
See application file for complete search history.

(56) References Cited

U.S. PATENT DOCUMENTS 6,100,887 A * 8/2000 Bormann ............ G06F 3/04847
345/440
6,901,558 B1 * 5/2005 Andreas .............. G06F 3/04847
715/739
(Continued)

FOREIGN PATENT DOCUMENTS

CN    101295244    10/2008
CN    102163308 A    8/2011
(Continued)

OTHER PUBLICATIONS

Doctor Mike, "Restoring an Original Price" Aug. 6, 1996, retrieved from <http://mathforum.org/library/drmath/view/58113.html> total pp. 2.*

(Continued)

*Primary Examiner* — Marina Lee
(74) *Attorney, Agent, or Firm* — Brinks Gilson & Lione

(57) ABSTRACT

A method and device for displaying incremental update progress. The method includes: drawing representation parts corresponding to a file package increment and a file package non-increment in one and the same geometric graph using a first color and a second color, respectively; and in a process of loading the file package increment, updating the first color of the representation part corresponding to the file package increment, until the first color of the representation part
(Continued)

corresponding to the file package increment is completely changed into the second color.

15 Claims, 5 Drawing Sheets

(56) References Cited

U.S. PATENT DOCUMENTS

| | | | |
|---|---|---|---|
| 7,089,494 B1* | 8/2006 | Burrell | G06F 17/2217 715/207 |
| 7,171,628 B1* | 1/2007 | Perttunen | G06F 8/61 715/713 |
| 8,122,368 B2* | 2/2012 | Chakra | G06F 9/4443 715/772 |
| 8,490,083 B1* | 7/2013 | Perttunen | G06F 8/61 715/705 |
| 2002/0054166 A1* | 5/2002 | Decombe | G06F 3/0481 715/853 |
| 2003/0018822 A1* | 1/2003 | Robb | H04L 41/0226 709/250 |
| 2006/0048184 A1* | 3/2006 | Poslinski | H04N 5/44543 725/45 |
| 2008/0256474 A1* | 10/2008 | Chakra | G06F 3/0481 715/772 |
| 2009/0113334 A1* | 4/2009 | Chakra | G06F 9/4443 715/772 |
| 2009/0284658 A1* | 11/2009 | Cho | G11B 27/34 348/569 |
| 2012/0066612 A1* | 3/2012 | Virmani | G06F 3/0481 715/748 |
| 2012/0096387 A1* | 4/2012 | Fu | H04L 67/06 715/772 |
| 2012/0293327 A1* | 11/2012 | Mountain | G06F 3/0481 340/540 |
| 2014/0331166 A1* | 11/2014 | Li | G06F 3/0481 715/772 |
| 2015/0100955 A1 | 4/2015 | Chen et al. | |
| 2015/0310507 A1* | 10/2015 | Woodward | H04L 51/32 705/329 |

FOREIGN PATENT DOCUMENTS

| | | |
|---|---|---|
| CN | 102724308 A | 10/2012 |
| CN | 102790961 A | 11/2012 |

OTHER PUBLICATIONS

International Search Report issued in related application PCT/CN2013/078901, pp. 1-4.
Office Action dated Sep. 2, 2016 for Chinese Patent Application No. 201210512235.X, 6 pages.

* cited by examiner

US 9,892,013 B2

METHOD AND DEVICE FOR DISPLAYING INCREMENTAL UPDATE PROGRESS

CROSS-REFERENCE RELATED APPLICATIONS

The present application claims the priority and is a continuation of PCT/CN2013/078901, filed on Jul. 5, 2013 and entitled "METHOD AND DEVICE FOR DISPLAYING INCREMENTAL UPDATE PROGRESS", which claims priority to Chinese Patent Application No. 201210512235.X, filed with the Chinese State Intellectual Property Office on Dec. 4, 2012 and entitled "METHOD AND DEVICE FOR DISPLAYING INCREMENTAL UPDATE PROGRESS", which are incorporated herein by reference in their entireties.

FIELD OF THE TECHNOLOGY

The present disclosure relates to the field of computer technologies.

BACKGROUND OF THE DISCLOSURE

During incremental update of software, a user only needs to download a part in which code is changed or an incremental part, and then combines the part and an original installation file package to form a new installation file package, in order to update software.

In order to make a user know how much of a current software installation file package has been downloaded or installed during the downloading process or software installing process, a typical method involves displaying current progress by a progress bar. In the downloading or installing process, extension of the progress bar indicates to what degree the current downloading or installing has proceeded.

It is required to provide a method for displaying incremental update progress, to adapt to characteristics of incremental update.

SUMMARY

In view of the foregoing problem, the present disclosure provides a method and an apparatus for displaying incremental update progress.

According to a first aspect of the present disclosure, a method for displaying incremental update progress is provided. The method includes:

drawing representation parts corresponding to a file package increment and a file package non-increment in a same geometric figure by using a first color and a second color respectively; and updating the first color of the representation part corresponding to the file package increment in a process of downloading the file package increment, until the first color of the representation part corresponding to the file package increment is completely changed into the second color.

According to a second aspect of the present disclosure, an apparatus for displaying incremental update progress is provided. The apparatus includes:

a drawing module, configured to draw representation parts corresponding to a file package increment and a file package non-increment in a same geometric figure by using a first color and a second color respectively; and an update module, configured to update the first color of the representation part corresponding to the file package increment in a process of downloading the file package increment, until the first color of the representation part corresponding to the file package increment is completely changed into the second color.

According to embodiments of the present invention, in an initial state, representation parts corresponding to a file package increment and a file package non-increment are drawn in a same geometric figure by using a first color and a second color respectively instead of using 100% of a geometric figure to represent a to-be-downloaded or to-be-installed file package increment; therefore, in a process of downloading the file package increment, only the first color of the representation part corresponding to the file package increment is updated. According to the method provided in the present disclosure, display of a file package non-increment enables a user to actually learn how much traffic has been saved, display of update progress of a file package increment is shortened visually, and perception that downloading or installing is quickened is enhanced, thereby bringing good downloading or installing experience to users.

BRIEF DESCRIPTION OF THE DRAWINGS

To illustrate technical solutions in embodiments of the present invention more clearly, the following briefly introduces accompanying drawings required for describing the existing technology or the embodiments. Apparently, the accompanying drawings in the following description show merely some embodiments of the present invention, and a person of skill in the art may still derive other drawings from these accompanying drawings.

DESCRIPTION OF EMBODIMENTS

The following describes technical solutions in embodiments of the present invention clearly and completely with reference to the accompanying drawings in the embodiments of the present invention. Apparently, the described embodiments are merely some rather than all embodiments of the present invention. All other embodiments obtained by a person skilled in the art based on the embodiments of the present invention shall fall within the protection scope of the present disclosure.

Figure 1:
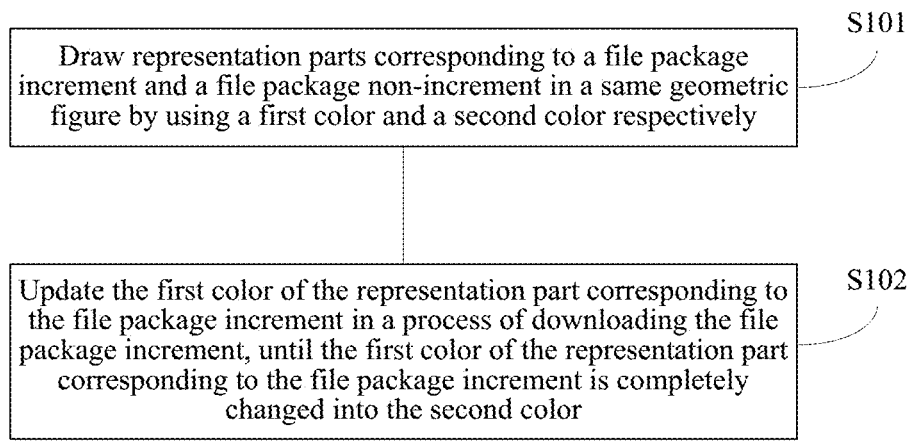
FIG. 1 is a schematic flowchart of a method for displaying incremental update progress according to an embodiment of the present invention.

Referring to FIG. 1, a method for displaying incremental update progress according to an embodiment of the present invention includes step S101 and step S102.

In step S101, representation parts corresponding to a file package increment and a file package non-increment are drawn in a same geometric figure by using a first color and a second color respectively.

Figure 2A:
FIG. 2A is a schematic diagram of using a rectangle to represent a whole file package according to an embodiment of the present invention.
Figure 2B:
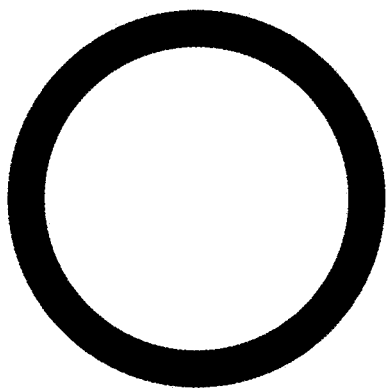
FIG. 2B is a schematic diagram of using an annulus to represent a whole file package according to an embodiment of the present invention.
Figure 2C:
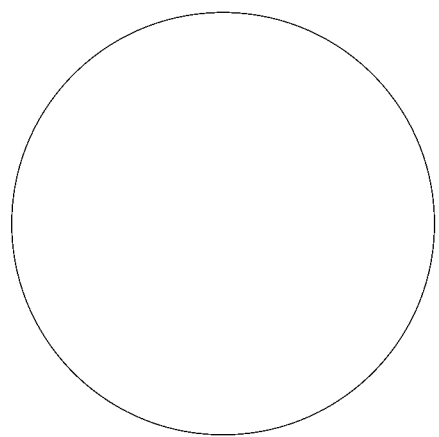
FIG. 2C is a schematic diagram of using a circular pie to represent a whole file package according to an embodiment of the present invention.

In this embodiment of the present invention, a geometric figure may be used to represent a whole file package. In order to reduce drawing difficulty, the geometric figure may be some relatively regular geometric figures such as a rectangle, an annulus, or a circular pie as shown in FIG. 2A, FIG. 2B, and FIG. 2C. It should be noted that, any geometric figure may be used to represent a whole file package without departing from the scope of the present disclosure.

According to an exemplary implementation solution, when representation parts corresponding to a file package increment and a file package non-increment are drawn in a same geometric figure by using a first color and a second color respectively, the percentage of the file package increment in a whole file package may be calculated first. For illustrative purpose, the percentage of the file package increment in the whole file package may be represented by a %. For example, if a whole file package is 10M (i.e., 10 mega bites) and an increment is 2.5M, the percentage of the file package increment in the whole file package is 25%, that is, a %=25%. Because the whole file package includes the increment and a non-increment, if the percentage of the file package increment in the whole file package is a %, the percentage of the file package non-increment in the whole file package is 1-a %. After the percentage of the file package increment in the whole file package is calculated, the first color may be used to fill a part S*a % in the geometric figure and the second color may be used to fill a part S*(1-a %) in the geometric figure according to the percentage a %. Therefore, the part S*a % in the geometric figure is the representation part corresponding to the file package increment and the part S*(1-a %) in the geometric figure is the representation part corresponding to the file package non-increment, where S is an area of the geometric figure.

Figure 3A:
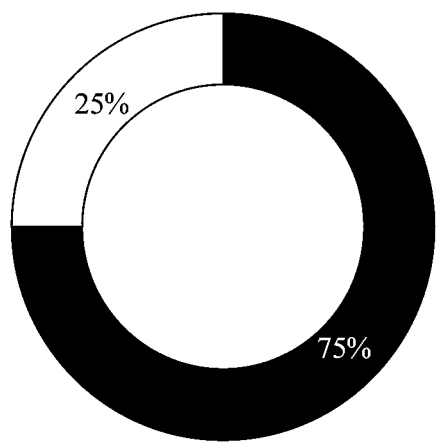
FIG. 3A is a schematic diagram of drawing a part corresponding to a file package increment and a part corresponding to a file package non-increment in a same annulus by using two different colors according to an embodiment of the present invention.
Figure 3B:
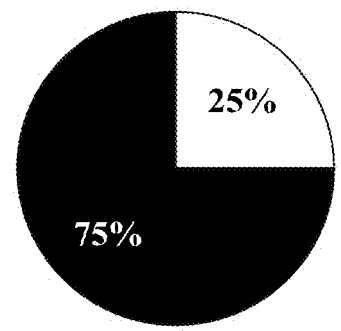
FIG. 3B is a schematic diagram of drawing a part corresponding to a file package increment and a part corresponding to a file package non-increment in a same circular pie by using two different colors according to an embodiment of the present invention.

In an example, a geometric figure representing a whole file package is an annulus. As shown in FIG. 3A, assuming that a file package increment accounts for 25% of the whole file package, a first color is used to draw a representation part corresponding to a file package increment in the geometric figure and a second color is used to draw a representation part corresponding to a file package non-increment in the geometric figure. In an example, a geometric figure representing a whole file package is a circular pie. As shown in FIG. 3B, assuming that a file package increment accounts for 25% of the whole file package, a first color is used to draw a representation part corresponding to a file package increment in the geometric figure and a second color is used to draw a representation part corresponding to a file package non-increment in the geometric figure.

It should be noted that the present embodiment is not limited to a first color and a second color for a representation part of a file package increment and a representation part of a file package non-increment as shown in the drawings. Any colors can be used as long as the representation part of the file package increment can be distinguished from the representation part of the file package non-increment. For example, the first color may be colorless or transparent and the second color may be colored or non-transparent, or the first color may be colored or non-transparent and the second color may be colorless or transparent. In the examples of FIG. 3A and FIG. 3B, the representation part corresponding to the file package increment is drawn in white and the representation part corresponding to the file package non-increment is drawn in black.

In S102, the first color of the representation part corresponding to the file package increment is updated in a process of downloading the file package increment, until the first color of the representation part corresponding to the file package increment is completely changed into the second color.

In exemplary implementation, a mapping relationship between a download volume of the file package increment and an increment of the representation part corresponding to the file package non-increment may be established. For example, if a download volume of the file package increment is represented by Δm and an increment of the representation part corresponding to the file package non-increment is represented by Δy, a mapping relationship between Δy and Δm may be represented by Δy=ƒ(Δm), where ƒ represents a mapping rule. For example, the mapping rule may be: when a download volume Δm of the file package increment accounts for b % of a whole file package, an increment of the representation part corresponding to the file package non-increment accounts for b % of an area of the whole figure.

Figure 4A:
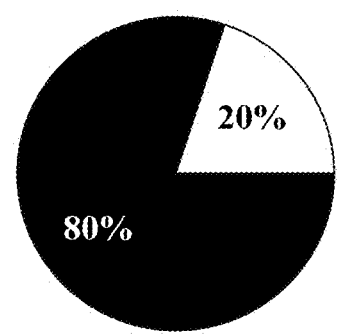
FIG. 4A is a schematic diagram of covering, each time a part of a file package increment is downloaded, a representation part corresponding to the part of the file package increment with a second color according to an embodiment of the present invention.
Figure 4B:
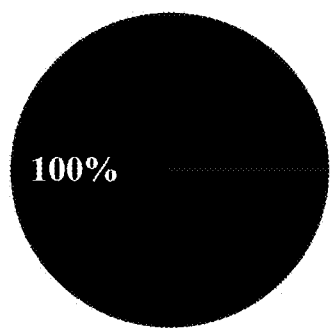
FIG. 4B is a schematic diagram of completely covering a representation part corresponding to a file package increment with a second color when downloading of the file package increment ends according to an embodiment of the present invention.

After the mapping relationship between the download volume of the file package increment and the increment of the representation part corresponding to the file package non-increment is established, each time a part of the file package increment is downloaded, a representation part corresponding to the part of the file package increment is covered with the second color according to the mapping relationship by using an ending edge of the representation part corresponding to the file package non-increment or a beginning edge of the representation part corresponding to the file package increment as a start position, until the second color completely covers the first color. In an example, a whole file package is 10M, a file package increment is 2.5M, and a file package non-increment is 7.5M. As shown in FIG. 3B, representation parts corresponding to the file package increment and the file package non-increment are drawn in a same geometric figure (the color of the file package increment is white and the color of the file package non-increment is black). It is assumed that at a certain time point during a process of downloading the file package increment, 0.5M, which accounts for 5% of the whole file package, of the file package increment is downloaded. Therefore, according to the mapping relationship Δy=ƒ(Δm) in the foregoing example, an increment of the representation part of the file package non-increment accounts for 5% of the area of the whole circular pie, that is, at this time, the representation part corresponding to the file package non-increment accounts for 80% of the area of the whole circular pie, as shown in FIG. 4A. As the process of downloading the file package increment proceeds, the second color used for the representation part corresponding to the file package non-increment continuously covers the representation part corresponding to the file package increment. When downloading of the file package increment ends, the second color used for the representation part corresponding to the file package non-increment completely covers the representation part corresponding to the file package increment, as shown in FIG. 4B.

According to the method for displaying incremental update progress provided in the foregoing embodiments of the present invention, in an initial state, representation parts corresponding to a file package increment and a file package non-increment are drawn in a same geometric figure by using a first color and a second color respectively instead of using 100% of a geometric figure to represent a to-be-downloaded or to-be-installed file package increment; therefore, in a process of downloading a file package increment, only the first color of the representation part corresponding to the file package increment is updated. Therefore, according to the method provided in the present disclosure, display of a file package non-increment enables a user to actually learn how much traffic has been saved, display of update progress of a file package increment is shortened visually, and perception that downloading or installing is quickened is enhanced, thereby bringing good downloading or installing experience to users.

Figure 5:
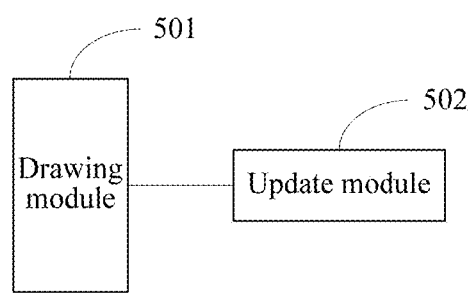
FIG. 5 is a schematic structural diagram of an apparatus for displaying incremental update progress according to an embodiment of the present invention.

FIG. 5 is a schematic structural diagram of an apparatus for displaying incremental update progress according to an embodiment of the present invention. For ease of description, only parts related to this embodiment of the present invention are shown. As shown in FIG. 5, the apparatus for displaying incremental update progress may include a processor and instructions for the processor to comprise a drawing module 501 and an update module 502.

The drawing module 501 is configured to draw representation parts corresponding to a file package increment and a file package non-increment in a same geometric figure by using a first color and a second color respectively.

The update module 502 is configured to update the first color of the representation part corresponding to the file package increment in a process of downloading the file package increment, until the first color of the representation part corresponding to the file package increment is completely changed into the second color.

It should be noted that, in the apparatus for displaying incremental update progress, the division of the functional modules is merely exemplary for illustrative purpose. In actual application, the functions may be allocated to different functional modules according to needs, for example, consideration of configuration requirements of corresponding hardware or convenient implementation of software, that is, an internal structure of the apparatus for displaying incremental update progress is divided to different functional modules to complete all or some of the above described functions. Moreover, in actual application, corresponding functional modules in this embodiment may be implemented by corresponding hardware, or may be implemented by corresponding hardware executing corresponding software. For example, the foregoing drawing module may be hardware, for example, a drawing machine, which is used especially to draw representation parts corresponding to a file package increment and a file package non-increment in a same geometric figure by using a first color and a second color respectively, or may be a general processor or other hardware devices capable of executing corresponding computer programs to implement the foregoing function. For another example, the foregoing update module may be hardware, for example, an updater, which is used especially to update the first color of the representation part corresponding to the file package increment in a process of downloading the file package increment, until the first color of the representation part corresponding to the file package increment is completely changed into the second color, or may be a general processor or other hardware devices capable of executing corresponding computer programs to implement the foregoing function. The foregoing description principle is applicable to all the embodiments provided in this specification.

Figure 6:
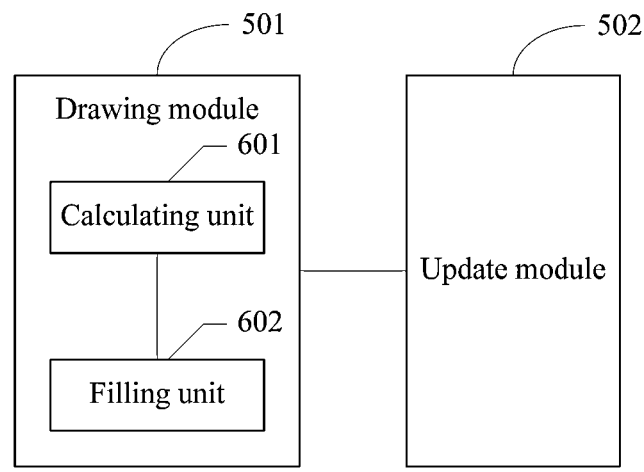
FIG. 6 is a schematic structural diagram of an apparatus for displaying incremental update progress according to another embodiment of the present invention.

FIG. 6 shows an apparatus for displaying incremental update progress according to another embodiment of the present invention. The apparatus differs from the apparatus shown in FIG. 5 in that the drawing module 501 may include a calculating unit 601 and a filling unit 602.

The calculating unit 601 is configured to calculate the percentage a % of the file package increment in a file package. The filling unit 602 is configured to use the first color to fill a part S*a % in the geometric figure and use the second color to fill a part S*(1-a %) in the geometric figure, where the part S*a % in the geometric figure is the representation part corresponding to the file package increment, the part S*(1-a %) in the geometric figure is the representation part corresponding to the file package non-increment, and S is an area of the geometric figure.

Figure 7:
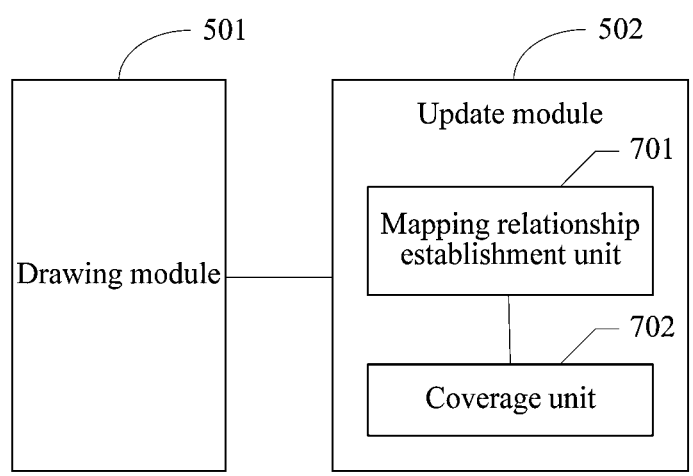
FIG. 7 is a schematic structural diagram of an apparatus for displaying incremental update progress according to still another embodiment of the present invention.

FIG. 7 shows an apparatus for displaying incremental update progress according to still another embodiment of the present invention. The apparatus differs from the apparatus shown in FIG. 5 in that the update module 502 may include a mapping relationship establishment unit 701 and a coverage unit 702.

The mapping relationship establishment unit 701 is configured to establish a mapping relationship between a download volume of the file package increment and an increment of the representation part corresponding to the file package non-increment.

The coverage unit 702 is configured to cover, each time a part of the file package increment is downloaded, a representation part corresponding to the part of the file package increment with the second color according to the mapping relationship by using an ending edge of the representation part corresponding to the file package non-increment or a beginning edge of the representation part corresponding to the file package increment as a start position, until the second color completely covers the first color.

In the apparatus for displaying incremental update progress shown in FIG. 5 to FIG. 7, the first color may be colorless or transparent and the second color may be colored or non-transparent, or the first color may be colored or non-transparent and the second color may be colorless or transparent, and the geometric figure representing the whole file package may be a rectangle, an annulus, a circular pie, or the like, which are not limited in the present disclosure.

In addition, an embodiment of the present invention further provides a program product in which machine readable instructions are stored. When code of the instructions is read and executed by a machine, the machine performs the method for displaying incremental update progress. Correspondingly, various storage mediums, such as a magnetic disk, an optical disc, a magnetic and optical disc, and a semi-conductor memory, for carrying this type of program product are also included in the present disclosure.

The foregoing machine readable storage mediums include, but are not limited to, various memories, storage units, semi-conductor devices, magnetic units such as an optical disc, a magnetic disk, and a magnetic and optical disc, and other mediums suitable for storing information.

The present disclosure may be implemented as a method, an electronic device, and/or a computer program product. Therefore, the present disclosure may be implemented in hardware and/or software (including firmware, resident software, micro code, and the like). In addition, the present disclosure may be in a form of a computer program product on a computer available or readable storage medium, where the storage medium includes computer available or readable program code implemented in this medium, so that the computer available or readable program code is used by an instruction executing system or used in combination with an instruction executing system. In the context herein, the computer available or readable medium may be any medium that can include, store, or transmit a program and is used by an instruction executing system, apparatus, or device or is used in combination with an instruction executing system, apparatus, or device.

It may be understood by a person of ordinary skill in the art that all or some of the steps of various methods of the foregoing embodiments may be implemented by a program instructing relevant hardware. The program may be stored in a computer readable storage medium. The storage medium may include, but is not limited to, a read-only memory (ROM), a random access memory (RAM), a magnetic disk, an optical disc, or the like.

The method and apparatus for displaying incremental update progress provided in the present disclosure are introduced above in detail. The descriptions of the foregoing embodiments are merely intended for ease of understanding of the method and the core idea of the present disclosure. Besides, a person of ordinary skill in the art can make modifications in terms of a specific implementation manner and the application scope according to the idea of the present disclosure. In conclusion, the content of this specification shall not be understood as a limitation on the present disclosure.

What is claimed is:

1. A method for displaying incremental update progress of software, comprising:
   drawing representation parts corresponding to an installation file package increment of the software for updating the software and an installation file package non-increment of the software for updating the software, in a same geometric figure by using a first color and a second color respectively before starting downloading the file package increment of the software, wherein the percentage of the drawn representation part corresponding to the file package non-increment in the geometric figure is less than 100% in area;
   downloading the file package increment of the software;
   establishing a mapping relationship between a download volume of the file package increment of the software and an increasing amount of the representation part corresponding to the file package non-increment of the software; and
   updating the first color of the representation part corresponding to the file package increment during downloading of the file package increment, until the first color of the representation part corresponding to the file package increment is completely changed into the second color.

2. The method according to claim 1, further comprising: covering, each time a part of the file package increment is downloaded, a representation part corresponding to the part of the file package increment with the second color according to the mapping relationship by using an ending edge of the representation part corresponding to the file package non-increment or a beginning edge of the representation part corresponding to the file package increment as a start position, until the second color completely covers the first color.

3. The method according to claim 1, further comprising:
   calculating a percentage a % of the file package increment in a file package; and
   using the first color to fill a part S*a % in the geometric figure and using the second color to fill a part S*(1-a %) in the geometric figure, wherein the part S*a % in the geometric figure is the representation part corresponding to the file package increment, the part S*(1-a %) in the geometric figure is the representation part corresponding to the file package non-increment, and S is an area of the geometric figure.

4. The method according to claim 1, wherein one of the first color and the second color is colorless or transparent and the other one of the first color and the second color is colored or non-transparent.

5. The method according to claim 1, wherein the geometric figure is one of an annulus, and a circular pie.

6. An apparatus for displaying incremental update progress of software, comprising:
   a processor and instructions for the processor to comprise:
   a drawing module, configured to draw representation parts corresponding to an installation file package increment of the software for updating the software and an installation file package non-increment of the software for updating the software, in a same geometric figure by using a first color and a second color respectively before starting downloading the file package increment of the software, wherein the percentage of the drawn representation part corresponding to the file package non-increment in the geometric figure is less than 100% in area; and
   an update module, configured to update the first color of the representation part corresponding to the file package increment in a process of downloading the file package increment, until the first color of the representation part corresponding to the file package increment is completely changed into the second color,
   wherein the update module comprises:
   a mapping relationship establishment unit, configured to establish a mapping relationship between a download volume of the file package increment and an increasing amount of the representation part corresponding to the file package non-increment.

7. The apparatus according to claim 6, wherein the update module further comprises:
   a coverage unit, configured to cover, each time a part of the file package increment is downloaded, a representation part corresponding to the part of the file package increment with the second color according to the mapping relationship by using an ending edge of the representation part corresponding to the file package non-increment or a beginning edge of the representation part corresponding to the file package increment as a start position, until the second color completely covers the first color.

8. The apparatus according to claim 6, wherein the drawing module comprises:
   a calculating unit, configured to calculate a percentage a % of the file package increment in a file package; and a filling unit, configured to use the first color to fill a part S*a % in the geometric figure and use the second color to fill a part S*(1-a %) in the geometric figure, wherein the part S*a % in the geometric figure is the representation part corresponding to the file package increment, the part S*(1-a %) in the geometric figure is the representation part corresponding to the file package non-increment, and S is an area of the geometric figure.

9. The apparatus according to claim 6, wherein one of the first color and the second color is colorless or transparent and the other one of the first color and the second color is colored or non-transparent.

10. The apparatus according to claim 6, wherein the geometric figure is one of an annulus, and a circular pie.

11. A non-transitory computer readable medium, comprising computer program codes stored thereon, executable by one or more processors, wherein the computer program codes configure the one or more processors to:
configured to draw representation parts corresponding to an installation file package increment of software for updating the software and an installation file package non-increment of the software for updating the software, in a same geometric figure by using a first color and a second color respectively before starting downloading the file package increment of the software, wherein the percentage of the drawn representation part corresponding to the file package non-increment in the geometric figure is less than 100% in area;
configured to establish a mapping relationship between a download volume of the file package increment of the software and an increasing amount of the representation part corresponding to the file package non-increment of the software; and
configured to update the first color of the representation part corresponding to the file package increment in a process of downloading the file package increment, until the first color of the representation part corresponding to the file package increment is completely changed into the second color.

12. The non-transitory computer readable medium according to claim 11, wherein the geometric figure is a rectangle, an annulus, or a circular pie.

13. The non-transitory computer readable medium according to claim 11, wherein the geometric figure is one of an annulus, and a circular pie.

14. The non-transitory computer readable medium according to claim 11, wherein the computer program codes configure the one or more processors to:
cover, each time a part of the file package increment is downloaded, a representation part corresponding to the part of the file package increment with the second color according to the mapping relationship by using an ending edge of the representation part corresponding to the file package non-increment or a beginning edge of the representation part corresponding to the file package increment as a start position, until the second color completely covers the first color.

15. The non-transitory computer readable medium according to claim 11, wherein the computer program codes configure the one or more processors to:
calculate a percentage a % of the file package increment in a file package; and
use the first color to fill a part S*a % in the geometric figure and use the second color to fill a part S*(1-a %) in the geometric figure, wherein the part S*a % in the geometric figure is the representation part corresponding to the file package increment, the part S*(1-a %) in the geometric figure is the representation part corresponding to the file package non-increment, and S is an area of the geometric figure.

* * * * *